United States Patent
Dundas (10) Patent No.: US 9,489,203 B2
(45) Date of Patent: Nov. 8, 2016

(54) PRE-FETCHING INSTRUCTIONS USING PREDICTED BRANCH TARGET ADDRESSES

(71) Applicant: James D. Dundas, Austin, TX (US)

(72) Inventor: James D. Dundas, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 912 days.

(21) Appl. No.: 13/711,403

(22) Filed: Dec. 11, 2012

(65) Prior Publication Data
US 2014/0164748 A1   Jun. 12, 2014

(51) Int. Cl.
G06F 9/00   (2006.01)
G06F 9/38   (2006.01)
G06F 12/08   (2016.01)

(52) U.S. Cl.
CPC ........... G06F 9/3804 (2013.01); G06F 9/3806 (2013.01); G06F 12/0862 (2013.01)

(58) Field of Classification Search
CPC ............................ G06F 9/3806; G06F 9/3804
See application file for complete search history.

(56) References Cited

U.S. PATENT DOCUMENTS

| | | | |
|---|---|---|---|
| 7,234,045 B2* | 6/2007 | Henry | G06F 9/3806 712/204 |
| 8,181,005 B2 | 5/2012 | Zuraski, Jr. et al. | |
| 2013/0311724 A1* | 11/2013 | Walker | G06F 12/0811 711/136 |

* cited by examiner

Primary Examiner — Zachary K Huson (57) ABSTRACT

The present application describes a method and apparatus for prefetching instructions based on predicted branch target addresses. Some embodiments of the method include providing a second cache line to a second cache when a target address for a branch instruction in a first cache line of a first cache is included in the second cache line of the first cache and when the second cache line is not resident in the second cache.

23 Claims, 10 Drawing Sheets

PRE-FETCHING INSTRUCTIONS USING PREDICTED BRANCH TARGET ADDRESSES

BACKGROUND

This application relates generally to processing systems, and, more particularly, to prefetching instructions using predicted branch target addresses in processing systems.

Processing systems typically implement a hierarchical cache complex, e.g., a cache complex that includes an L2 cache and one or more L1 caches. For example, in a processing system that implements multiple processor cores, each processor core may have an associated L1 instruction (L1-I) cache and an L1 data (L1-D) cache. The L1-I and L1-D caches may be associated with a higher level L2 cache. When an instruction is scheduled for processing by the processor core, the processor core first attempts to fetch the instruction for execution from the L1-I cache, which returns the requested instruction if the instruction is resident in a cache line of the L1-I cache. However, if the request misses in the L1-I cache, the request is forwarded to the L2 cache. If the request hits in the L2 cache, the L2 cache returns the requested line to the L1-I cache. Otherwise, the L2 cache may request the line from a higher-level cache or main memory.

Prefetching may be used to populate the lines of the L1-I cache when the prefetcher can identify patterns (e.g., requests for a sequence of addresses) that can be used to predict the addresses of subsequent requests. For example, the prefetcher can use sequential addresses of two misses to the L1-I cache to predict that the L1-I cache is likely to receive requests for additional addresses that follow from the missed addresses in the same sequence. The prefetcher may therefore prefetch one or more addresses along the sequence into the L1-I cache so that these cache lines are available when requested.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Processing systems may implement branch target address calculators or predictors to predict the addresses of instructions that follow a branch instruction in a program, which can be used to generate instruction stream prefetches. However, since the address of the target instruction does not typically follow in sequence from the address of the branch instruction, the prefetcher may need to start a new stream for prefetching instructions following the target of the predicted branch instruction. For example, if a demand request for an instruction at the target address misses in the L1-I cache, the prefetcher may begin initializing a new stream for prefetching instructions following the target instruction. However, this process requires one or more L1-I cache tag lookups to determine whether the requested line is in the L1-I cache. The additional cache tag lookups consume power and time. The disclosed subject matter is directed to addressing the effects of one or more of the problems set forth above.

In some embodiments, a method is provided for prefetching instructions based on predicted branch target addresses. Some embodiments of the method include providing a second cache line to a second cache when a target address for a branch instruction in a first cache line of a first cache is included in the second cache line of the first cache and when the second cache line is not resident in the second cache.

In some embodiments, an apparatus is provided for prefetching instructions based on predicted branch target addresses. Some embodiments of the apparatus include a first cache, one or more second caches, and a branch target address calculator configurable to provide a second cache line to a second cache when a target address for a branch instruction in a first cache line of a first cache is included in the second cache line of the first cache and when the second cache line is not resident in the second cache.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter may be modified and may take alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION

Illustrative embodiments are described below. In the interest of clarity, not all features of an actual implementation are described in this specification. It should be appreciated that in the development of any such actual embodiment, numerous implementation-specific decisions should be made, which may vary from one implementation to another. Moreover, it should be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

As discussed herein, processing systems may implement branch target address calculators or predictors to predict the addresses of instructions that follow a branch instruction in a program, which can be used to generate instruction stream prefetches. However, since the address of the target instruction does not typically follow in sequence from the address of the branch instruction, the prefetcher may need to start a new stream for prefetching instructions following the target of the predicted branch instruction. Furthermore, additional information is needed to predict a target address for a branch instruction that lies within a cache line of an L1-I cache when the target address is not in the L1-I cache.

Some embodiments of processing systems may therefore implement a separate structure that holds branch information including targets for branch instructions in the cache lines of the L1-I caches. Some embodiments of the structure may not be logically tied to the L1 instruction cache lines. For example, a Branch Target Buffer (BTB) is a separate cache of branch instruction information including target address information. The BTB uses its own tags to identify the branch instruction information associated with different cache lines. Other embodiments may store information associated with the first N branches in program order in a cache line in a structure (which may be referred to as the "sparse") that is logically tied to each line in the L1 instruction cache and uses the same tags as the L1 instruction cache. Some embodiments may augment the information in the sparse by adding a small ("dense") BTB that caches information about branches in L1 cache lines that contain more than N branches. Examples of sparse and dense prediction caches may be found in U.S. Pat. No. 8,181,005 ("Hybrid Branch Prediction Device with Sparse and Dense Prediction Caches," Gerald D. Zuraski, et al), which is incorporated by reference herein in its entirety.

Some embodiments of the cache complex include logic for storing branch instruction information for branches in cache lines of an inclusive L2 cache. The branch instruction information may be stored in the L2 cache (or in an associated structure) in response to the cache line being evicted from the associated L1-I cache. In some embodiments, the branch instruction information may be provided to the L2 cache by evicting the sparse branch information corresponding to branches in L1-I cache lines that have been evicted from the L1 instruction cache out to the L2 cache. The branch information can then be stored (or "siloed") in additional bits that are associated with each L2 cache line. Some embodiments may store the information in L2 cache line ECC bits that are not needed to detect errors in L2 cache lines that only contain instructions. For example, if a requested cache line holds instructions, unused error correction code (ECC) bits in a data array in the inclusive L2 cache can be used to store (or "silo") the branch instruction markers for two branches associated with the cache line. The full complement of ECC bits may not be used because instructions can be reloaded from main-memory or L3 on an error detected with a subset of the ECC bits instead of using all of the ECC bits to correct the instruction-only line in situ.

Prefetching of lines into the L1 cache can be accelerated using information stored in the L2 cache. For example, if the branches are in-page target, direct branches, the L2 cache can reconstruct the branch target addresses in response to receiving a request for the cache line. The branch direction for conditional branches can be predicted using bias weight information in the branch instruction markers. Since the L2 cache is inclusive and tracks per-core L1 cache inclusion for each L2 line, the L2 cache can determine whether the target L2 cache line is resident in the corresponding L1-I cache. If the target L2 cache line is not resident in the corresponding L1-I cache, the L2 cache can cause the cache line to be prefetched into the L1-I cache. Some embodiments of the L2 cache can predict taken or not-taken branches and generate prefetches for sequential cache lines (e.g., in response to determining that the branch is non-taken) if the sequential cache lines are not resident in the L1-I cache. The L2 cache may therefore be able to follow both predicted taken and non-taken branches based on the branch prediction information available in the L2 cache.

This process may proceed iteratively if the branch target address references another cache line in the L2 cache, allowing the prefetching process to follow the likely path of future execution of the processor core. For example, if a predicted branch target address for requested line A is in line B, the L2 cache can prefetch line B into the L1-I cache. If the L2 cache tag array indicates that line B is also in the L2 cache, the L2 cache may use the branch instruction markers for line B to determine that a branch target address for line B is in line C, which may then be prefetched into the L1-I cache if the L2 cache determines that line C is not already resident in the L1-I cache. The L2 cache can therefore follow the future path of program execution and prefetch instructions into the L1-I cache appropriately. The branch bias can be used to predict the direction of conditional branches, allowing sequential lines to be prefetched if a branch is likely to be predicted as not-taken. This process can continue until a confidence threshold is exceeded, a maximum number of prefetched lines are pushed into a core, a branch is detected whose target cannot be computed (indirect or out-of-page), or some other stopping condition is satisfied. Some embodiments may use a stopping condition that is determined based on information in the L2 cache that indicates one or more aligned blocks that are known to contain branches, e.g., a dense[7:0] vector stored in the L2 cache that indicates an eight byte aligned block. If fetching begins (sequentially or by jumping into a line) at or before an aligned block indicated by a set bit in the dense[7:0] vector, some embodiments may assume that a branch in the aligned block would have been taken and define this condition as a stopping condition.

Figure 1:
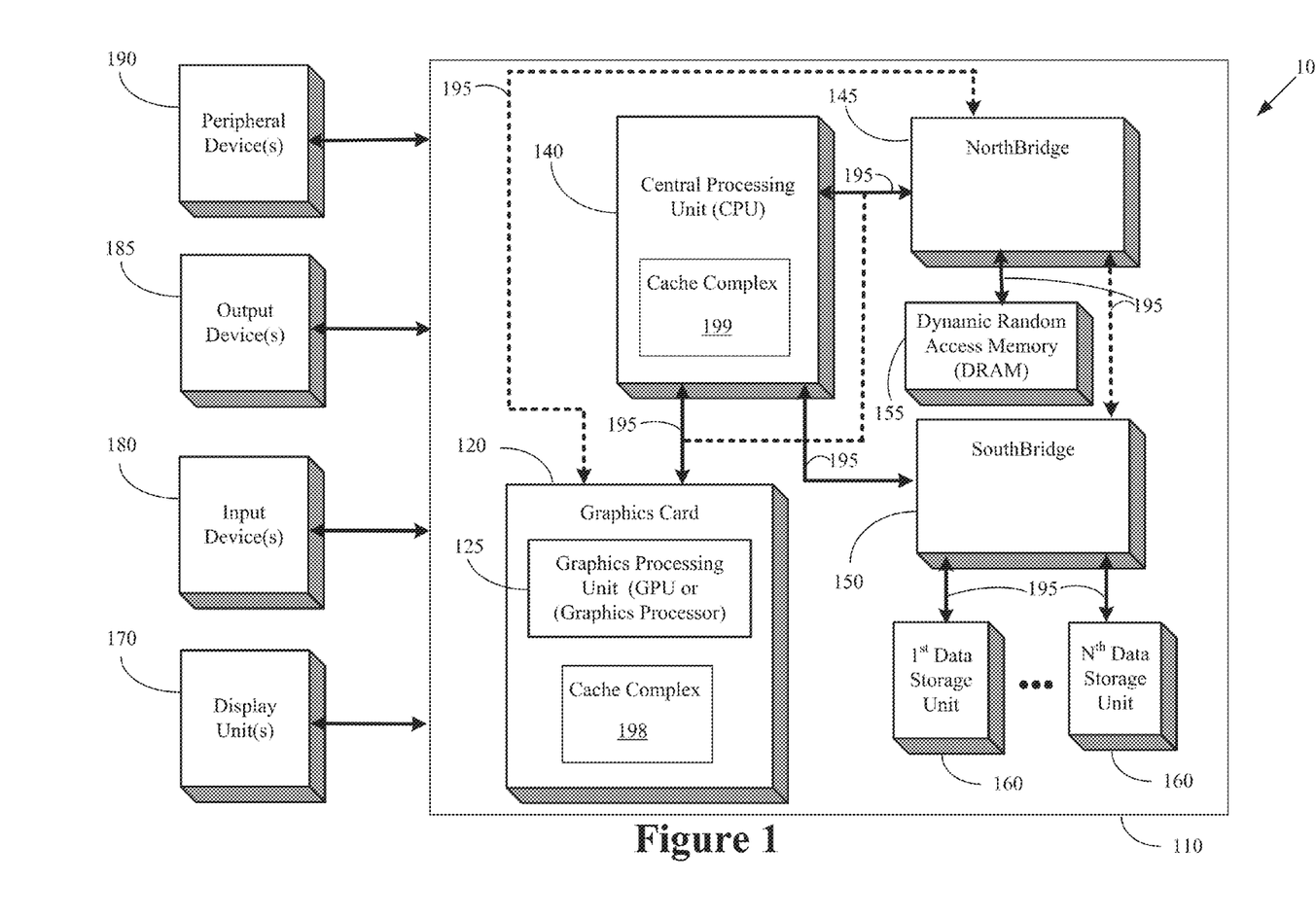
FIG. 1 conceptually illustrates a first example of a processor-based system, according to some embodiments.

FIG. 1 conceptually illustrates a first example of a computer system 100, according to some embodiments. In some embodiments, the computer system 100 may be a personal computer, a smart TV, a laptop computer, a handheld computer, a netbook computer, a mobile device, a tablet computer, a netbook, an ultrabook, a telephone, a personal data assistant (PDA), a server, a mainframe, a work terminal, or the like. The computer system includes a main structure 110 which may include a computer motherboard, system-on-a-chip, circuit board or printed circuit board, a desktop computer enclosure or tower, a laptop computer base, a server enclosure, part of a mobile device, tablet, personal data assistant (PDA), or the like. Some embodiments of the computer system 100 runs operating systems such as Linux®, Unix®, Windows®, Mac OS®, or the like.

Some embodiments of the main structure 110 include a graphics card 120. For example, the graphics card 120 may be an ATI Radeon™ graphics card from Advanced Micro Devices ("AMD"). The graphics card 120 may, in some embodiments, be connected on a Peripheral Component Interconnect (PCI) Bus (not shown), PCI-Express Bus (not shown), an Accelerated Graphics Port (AGP) Bus (also not shown), or other electronic or communicative connection. Some embodiments of the graphics card 120 may contain a graphics processing unit (GPU) 125 used in processing graphics data. The graphics card 120 may be referred to as a circuit board or a printed circuit board or a daughter card or the like.

The computer system 100 shown in FIG. 1 also includes a central processing unit (CPU) 140, which is electronically or communicatively coupled to a northbridge 145. The CPU 140 and northbridge 145 may be housed on the motherboard (not shown) or some other structure of the computer system 100. Some embodiments of the graphics card 120 may be coupled to the CPU 140 via the northbridge 145 or some other electromagnetic or communicative connection. For example, CPU 140, northbridge 145, or GPU 125 may be included in a single package or as part of a single die or "chip." In some embodiments, the northbridge 145 may be coupled to a system RAM 155 (e.g., DRAM) and in some embodiments the system RAM 155 may be coupled directly to the CPU 140. The system RAM 155 may be of any RAM type known in the art; the type of RAM 155 may be a matter of design choice. In some embodiments, the northbridge 145 may be connected to a southbridge 150. The northbridge 145 and southbridge 150 may be on the same chip in the computer system 100 or the northbridge 145 and southbridge 150 may be on different chips. In some embodiments, the southbridge 150 may be connected to one or more data storage units 160. The data storage units 160 may be hard drives, solid state drives, magnetic tape, or any other writable media used for storing data. The CPU 140, northbridge 145, southbridge 150, graphics processing unit 125, or DRAM 155 may be a computer chip or a silicon-based computer chip, or may be part of a computer chip or a silicon-based computer chip. In one or more embodiments, the various components of the computer system 100 may be operatively, electromagnetically, or physically connected or linked with a bus 195 or more than one bus 195.

The computer system 100 may be connected to one or more display units 170, input devices 180, output devices 185, or peripheral devices 190. In some embodiments, these elements may be internal or external to the computer system 100, and may be wired or wirelessly connected. The display units 170 may be internal or external monitors, television screens, handheld device displays, touchscreens, and the like. The input devices 180 may be any one of a keyboard, mouse, track-ball, stylus, mouse pad, mouse button, joystick, touchscreen, scanner or the like. The output devices 185 may be any one of a monitor, printer, plotter, copier, or other output device. The peripheral devices 190 may be any other device that can be coupled to a computer. Example peripheral devices 190 may include a CD/DVD drive capable of reading or writing to physical digital media, a USB device, Zip Drive, external hard drive, phone or broadband modem, router/gateway, access point or the like.

The GPU 120 and the CPU 140 may be associated with cache complexes 198, 199, respectively. In some embodiments, the cache complexes 198, 199 are hierarchical cache complexes that include a hierarchy of caches. For example, the cache complexes 198, 199 may include an inclusive L2 cache (not shown in FIG. 1) that is associated with one or more L1 instruction or data caches (not shown in FIG. 1). The cache complexes 198, 199 may read or write information to or from memory elements such as the DRAM 155 or the data storage units 160. The cache complexes 198, 199 may also receive or respond to probes, sniffs, or snoops from other elements in the system 100 including the northbridge 145, the southbridge 150, or other elements. As discussed herein, the cache complexes 198, 199 can be configured so that higher level caches (such as an L2 cache) can determine target addresses for branch instructions in resident lines and then issue prefetch requests to prefetch cache lines including the target addresses into lower level caches such as L1-I caches.

Figure 2:
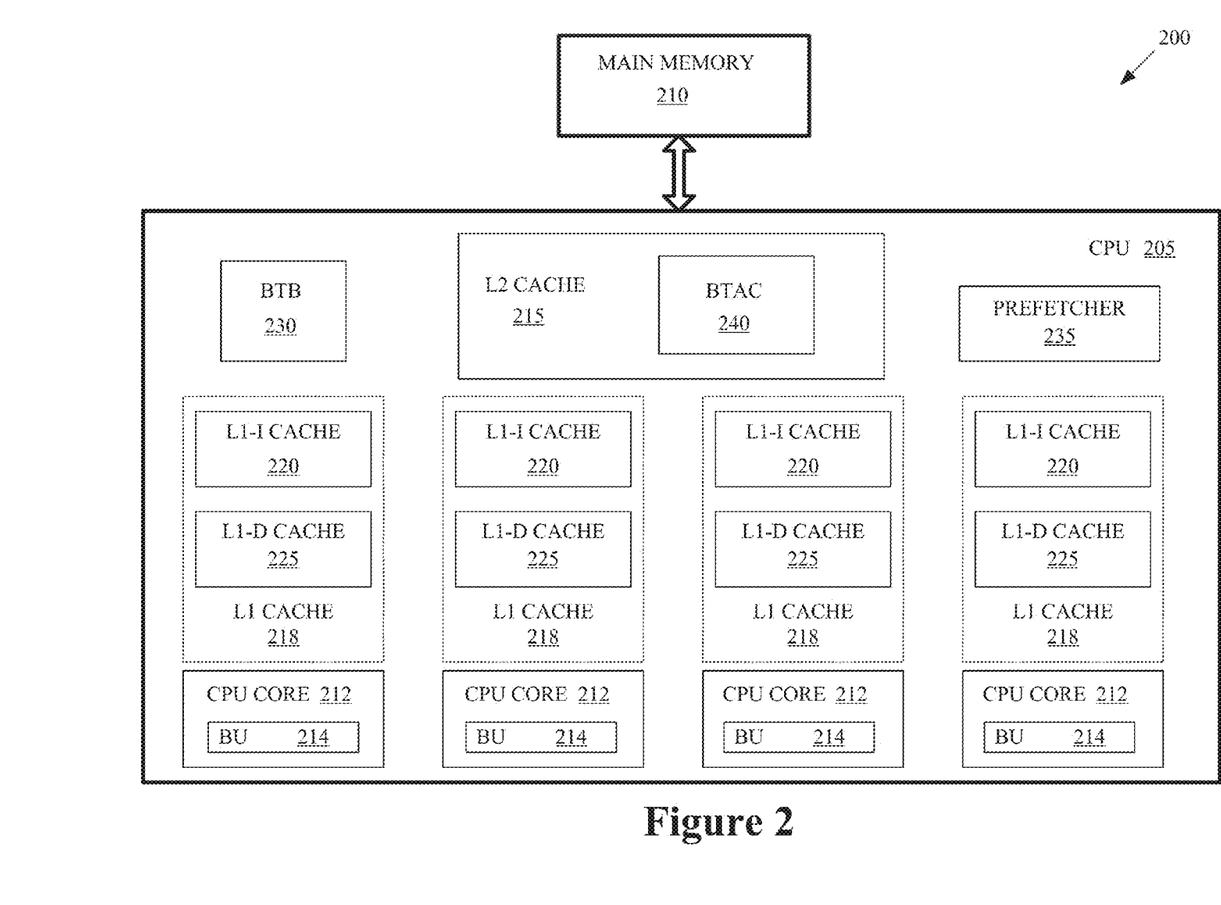
FIG. 2 conceptually illustrates an example of a semiconductor device that may be formed in or on a semiconductor wafer (or die), according to some embodiments.

FIG. 2 conceptually illustrates an example of a semiconductor device 200 that may be formed in or on a semiconductor wafer (or die), according to some embodiments. The semiconductor device 200 may be formed in or on the semiconductor wafer using well known processes such as deposition, growth, photolithography, etching, planarising, polishing, annealing, and the like. Some embodiments of the device 200 include a CPU 205 that is configured to access instructions or data that are stored in the main memory 210. The CPU 205 shown in FIG. 2 includes four processor cores 212 that may be used to execute the instructions or manipulate the data. The processor cores 212 may include a bus unit (BU) 214 for managing communication over bridges or buses in the processing system 200. The CPU 205 shown in FIG. 2 also implements a hierarchical (or multilevel) cache system that is used to speed access to the instructions or data by storing selected instructions or data in the caches. However, persons of ordinary skill in the art having benefit of the present disclosure should appreciate that some embodiments of the device 200 may implement different configurations of the CPU 205, such as configurations that use external caches, different types of processors (e.g., GPUs or APUs), or different numbers of processor cores 212. Moreover, some embodiments may associate different numbers or types of caches 218, 220, 225 with the different processor cores 212.

The cache system depicted in FIG. 2 includes a level 2 (L2) cache 215 for storing copies of instructions or data that are stored in the main memory 210. The L2 cache 215 shown in FIG. 2 is 4-way associative to the main memory 210 so that each line in the main memory 210 can potentially be copied to and from four cache lines (which are conventionally referred to as "ways") in the L2 cache 215. However, persons of ordinary skill in the art having benefit of the present disclosure should appreciate that embodiments of the main memory 210 or the L2 cache 215 can be implemented using any associativity including 2-way associativity, 8-way associativity, 16-way associativity, direct mapping, fully associative caches, and the like. Relative to the main memory 210, the L2 cache 215 may be implemented using faster memory elements. The L2 cache 215 may also be deployed logically or physically closer to the processor core 212 (relative to the main memory 210) so that information may be exchanged between the CPU core 212 and the L2 cache 215 more rapidly or with less latency.

The illustrated cache system also includes L1 caches 218 for storing copies of instructions or data that are stored in the main memory 210 or the L2 cache 215. Each L1 cache 218 is associated with a corresponding processor core 212. The L1 cache 218 may be implemented in the corresponding processor core 212 or the L1 cache 218 may be implemented outside the corresponding processor core 212 and may be physically, electromagnetically, or communicatively coupled to the corresponding processor core 212. Relative to the L2 cache 215, the L1 cache 218 may be implemented using faster memory elements so that information stored in the lines of the L1 cache 218 can be retrieved quickly by the corresponding processor core 212. The L1 cache 218 may also be deployed logically or physically closer to the processor core 212 (relative to the main memory 210 and the L2 cache 215) so that information may be exchanged between the processor core 212 and the L1 cache 218 more rapidly or with less latency (relative to communication with the main memory 210 and the L2 cache 215).

In some embodiments, the L1 caches 218 are separated into level 1 (L1) caches for storing instructions and data, which are referred to as the L1-I cache 220 and the L1-D cache 225. Separating or partitioning the L1 cache 218 into an L1-I cache 220 for storing instructions and an L1-D cache 225 for storing data may allow these caches to be deployed closer to the entities that are likely to request instructions or data, respectively. Consequently, this arrangement may reduce contention, wire delays, and generally decrease latency associated with instructions and data. A replacement policy dictates that the lines in the L1-I cache 220 are replaced with instructions from the L2 cache 215 and the lines in the L1-D cache 225 are replaced with data from the L2 cache 215. However, persons of ordinary skill in the art should appreciate that some embodiments of the L1 caches 218 may be partitioned into different numbers or types of caches that operate according to different replacement policies. Furthermore, persons of ordinary skill in the art should appreciate that some programming or configuration techniques may allow the L1-I cache 220 to store data or the L1-D cache 225 to store instructions, at least on a temporary basis.

The L2 cache 215 illustrated in FIG. 2 is inclusive so that cache lines resident in the L1 caches 218, 220, 225 are also resident in the L2 cache 215. Persons of ordinary skill in the art having benefit of the present disclosure should appreciate that the L1 caches 218 and the L2 cache 215 represent one example embodiment of a multi-level hierarchical cache memory system. However, some embodiments may use different multilevel caches including elements such as L0 caches, L1 caches, L2 caches, L3 caches, and the like, some of which may be inclusive of the others.

In operation, because of the low latency, a core 212 first checks its corresponding L1 caches 218, 220, 225 when it needs to retrieve or access an instruction or data. If the request to the L1 caches 218, 220, 225 misses, then the request may be directed to the L2 cache 215, which can be formed of a relatively slower memory element than the L1 caches 218, 220, 225. The main memory 210 is formed of memory elements that are slower than the L2 cache 215. For example, the main memory may be composed of denser (smaller) DRAM memory elements that take longer to read and write than the SRAM cells typically used to implement caches. The main memory 210 may be the object of a request in response to cache misses from both the L1 caches 218, 220, 225 and the inclusive L2 cache 215. The L2 cache 215 may also receive external probes, e.g. via a bridge or a bus, for lines that may be resident in one or more of the corresponding L1 caches 218, 220, 225.

The illustrated embodiment of the inclusive L2 cache 215 includes (or has access to) inclusion bits associated with each of the cache lines in the inclusive L2 cache 215. The inclusion bits may be associated with different subsets of the L1 caches 218, 220, 225. In some embodiments, one inclusion bit is used to indicate whether each cache line in the L2 cache 215 is resident in a corresponding L1 cache 218 that is associated with one of the cores 212. The resident line indicated by a set value of an inclusion bit may be in either the L1-I cache 220 or the L1-D cache 225. In some embodiments, other bits or information may also be used to determine whether to back probe one or more of the cores 212.

Figure 3:
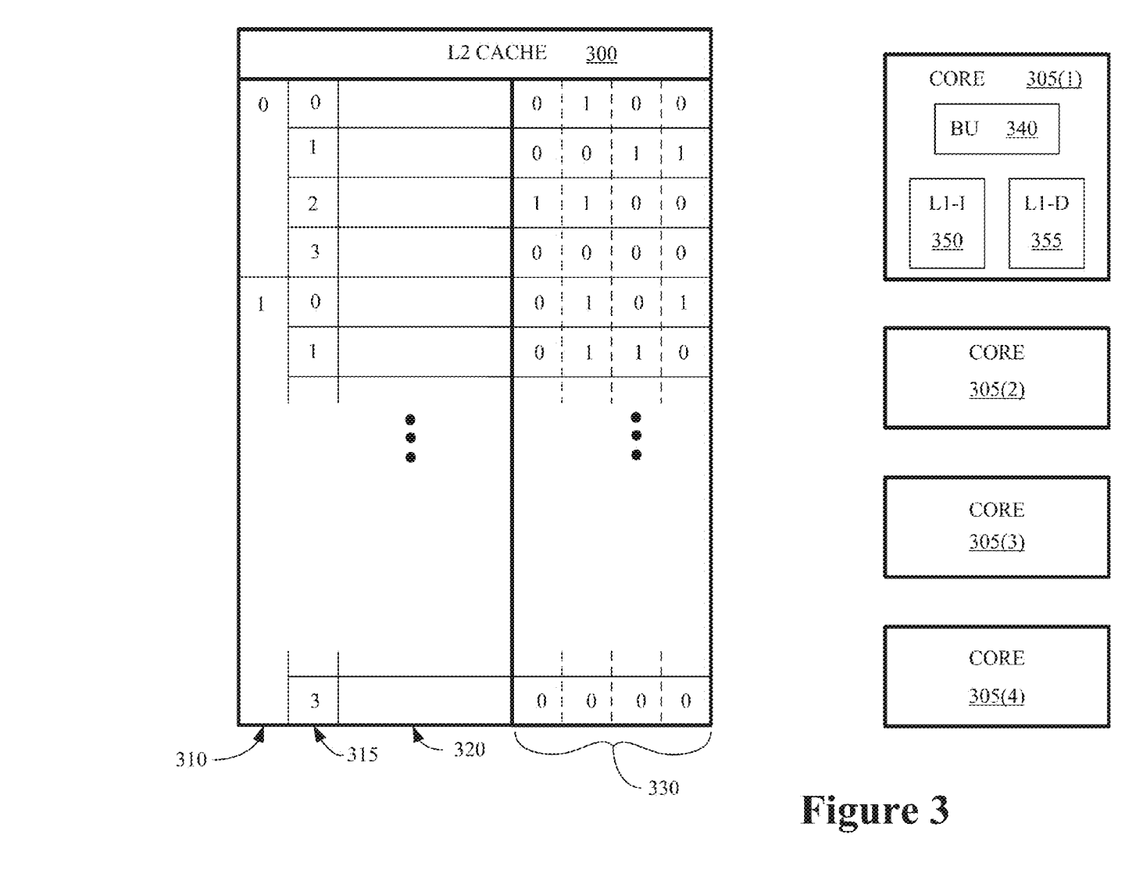
FIG. 3 conceptually illustrates examples of an L2 cache and associated processor cores, according to some embodiments.

FIG. 3 conceptually illustrates examples of an L2 cache 300 and associated processor cores 305, according to some embodiments. The L2 cache 300 shown in FIG. 3 is 4-way associative. The indexes are indicated in column 310 and the ways in the L2 cache 300 are indicated by the numerals 0-3 in the column 315. The column 320 indicates the associated cache lines, which may include information or data. Some embodiments of the L2 cache 300 are inclusive of lines 325 that are associated with instruction (L1-I) and data (L1-D) caches 350, 355 in the processor cores 305. Each line in the L2 cache 300 is associated with a set of inclusion bits 330. The inclusion bits 330 for each line are associated with different processor cores 305 and may be set to indicate whether the line is resident in either the instruction cache (L1-I) 350 or the data cache (L1-D) cache 355 in the corresponding processor core 305. For example, the inclusion bits 330 for the line (0, 0) indicate that the line (0, 0) is resident in one of the caches in the second processor core 305(2) because the second inclusion bit 330 for this line is set to a value of "1." The L2 cache 300 may use the values of the inclusion bits 330 to decide whether to issue prefetch requests to prefetch lines into the L1-I caches 350, as discussed herein.

Referring back to FIG. 2, some embodiments of the CPU 205 include a branch target buffer (BTB) 230 that is used to store branch information associated with cache lines in the L1 caches 218, 220, 225. The BTB 230 shown in FIG. 2 is a separate cache of branch instruction information including target address information for branch instructions that may be included in the cache lines in the L1 caches 218, 220, 225. The BTB 230 uses its own tags to identify the branch instruction information associated with different cache lines. Although the BTB 230 is depicted in FIG. 2 as a single entity separate from the L1 caches 218, 220, 225, persons of ordinary skill in the art having benefit of the present disclosure should appreciate that some embodiments of the CPU 205 may include multiple instances of the BTB 230 that are implemented in or associated with the different L1 caches 218, 220, 225. Some embodiments of the BTB 230 implement a sparse/dense branch marker arrangement in which sparse entries are logically tied to the L1-I cache 220 and are evicted to a silo in the L2 cache 215 on an L1 cache line eviction. Examples of a BTB 230 that implements a sparse/dense branch marker arrangement are discussed in U.S. Pat. No. 8,181,005. Examples of branch target information include, but is not limited to, information indicating whether the branch is valid, an end address of the branch, a bias direction of the branch, an offset, whether the branch target is in-page, or whether the branch is conditional, unconditional, direct, static, or dynamic. As discussed herein, branch target information in the BTB 230 may be provided to the L2 cache 215 when the associated line is evicted from one of the L1 caches 218, 220, 225.

Some embodiments of the CPU 205 include a prefetcher 235 that can be configured to prefetch cache lines into one or more of the L1 caches 218, 220, 225. Although the prefetcher 235 is depicted in FIG. 2 as a single entity separate from the L1 caches 218, 220, 225, persons of ordinary skill in the art having benefit of the present disclosure should appreciate that some embodiments of the CPU 205 may include multiple instances of the prefetcher 235 that are implemented in or associated with the different L1 caches 218, 220, 225.

Figure 4:
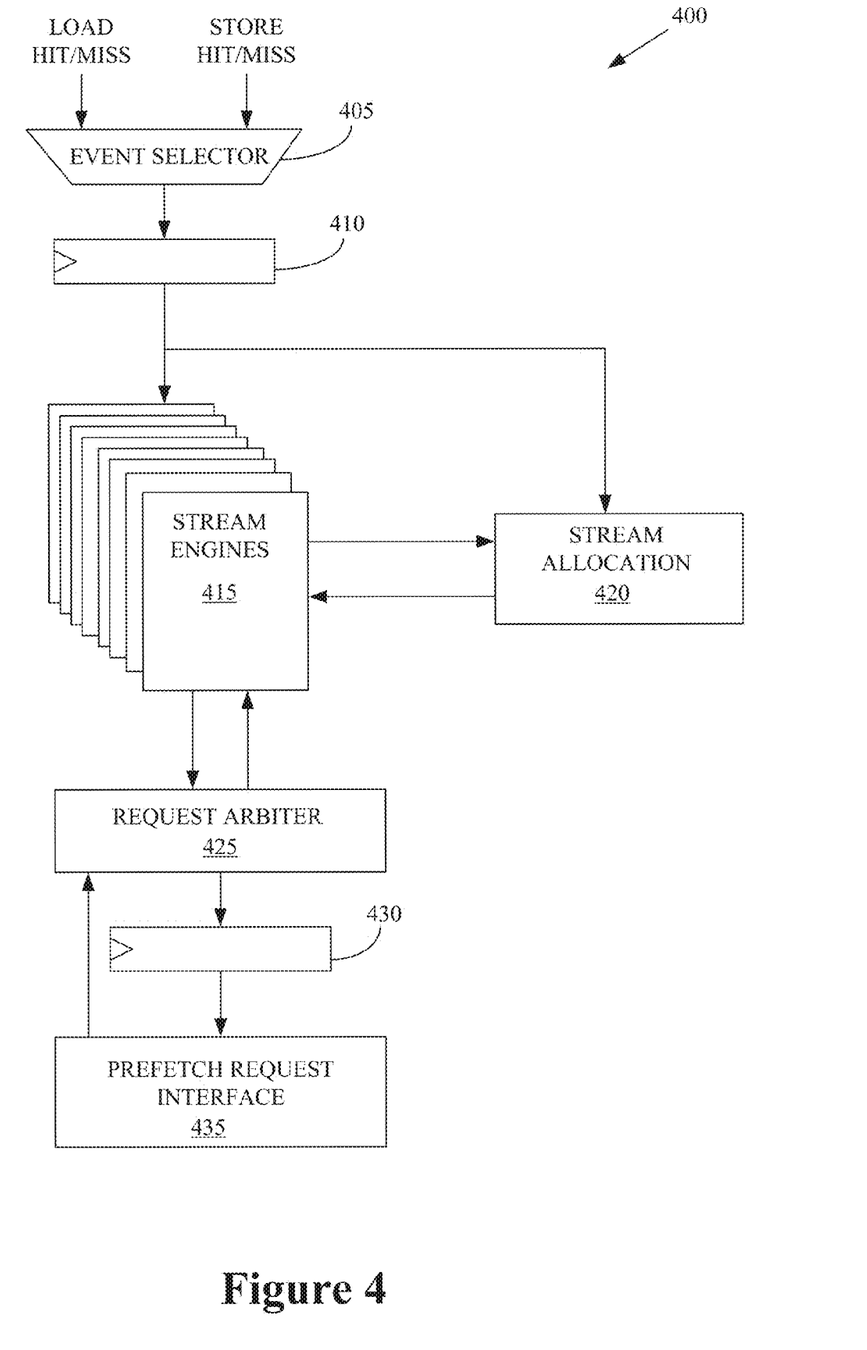
FIG. 4 conceptually illustrates an example of a prefetcher such as the prefetcher shown in FIG. 2, according to some embodiments.

FIG. 4 conceptually illustrates an example of a prefetcher 400 such as the prefetcher 235 of FIG. 2, according to some embodiments. Some embodiments of the prefetcher 400 receive signals indicating particular events related to memory access requests such as hits or misses associated with a load instruction, hits or misses associated with a store instruction, and the like. Miss address buffer (MAB) events, such as hit or miss events for load instructions or store instructions, may be received or accessed by an event selector block 405. The event selector block 405 may then select events that are to be passed to other stages of the prefetcher 400. For example, the highest priority event may be stored in the registers 410 until they are passed to one or more stream engines 415 and a stream allocation unit 420, e.g., during a subsequent clock cycle. The priority of events can be determined using a hierarchy such as giving the highest priority to load misses and then assigning successively lower priorities to store misses, load hits, and store hits. However, persons of ordinary skill in the art having benefit of the present disclosure should appreciate that alternative hierarchies can be used to establish the priorities of the events.

Some embodiments of the prefetcher 400 include one or more stream engines 415 that can each be used to manage a separate prefetch stream. Each stream engine 415 may provide a signal to the stream allocation unit 420 to indicate that the current event either hit or missed the stream managed by the stream engine 415. If none of the existing streams indicates a hit for the MAB miss event, then the stream allocation unit 420 can allocate a new stream to a different stream engine 415 using the current event information. When a stream is first allocated, the stream engine 415 sets a page address and an offset value to the current event cache line address. The stream engine 415 can then monitor further MAB events to detect events at addresses adjacent to the current event cache line address in either direction. For example, if the current event cache line address is set to A, then the stream engine 415 looks for events at addresses in relation to the current event cache line address, e.g., addresses A+1 or A−1. If the stream engine 415 sees one of the addresses, it defines a stream in the appropriate direction (positive for A+1 and negative for A−1) and trains a new prefetch stream.

The prefetcher 400 may also include a request arbiter 425 that is used to arbitrate prefetch requests from the stream engines 415. Some embodiments of the request arbiter 425 may also receive prefetch requests from other entities such as the L2 cache 215 shown in FIG. 2 and the request arbiter 425 may choose between the different requests. In some embodiments, the request arbiter 425 is a rotating priority arbiter. However, persons of ordinary skill in the art having benefit of the present disclosure should appreciate that other types of request arbiter 425 may alternatively be implemented in the prefetcher 400. Requests can be transferred from the request arbiter 425 to a register 430 so that the request information can be provided to a prefetch request interface 435, e.g., during a subsequent clock cycle. The prefetch request interface 435 can provide feedback to the request arbiter 425, which can be used to select or arbitrate between pending requests from the stream engines 415.

Referring back to FIG. 2, some embodiments of the L2 cache 215 include a branch target address calculator (BTAC) 240. Lines in the L2 cache 215 that are associated with or have been evicted from the L1-I caches 220 may include branch instructions that cause a program to branch to the address of another instruction, which may be in a different cache line or other memory location. The BTAC 240 can be configured to predict branch target addresses for branch instructions in the cache lines of the L2 cache 215 using branch information associated with the cache line. For example, the BTAC 240 may predict branch target addresses for instructions in the L2 cache line using branch information that was provided to the L2 cache 215 in response to the corresponding L1 cache line being evicted from the L1-I cache 220. The predicted branch target address may then be used to determine whether the predicted target address is included in one of the L2 cache lines. The L2 cache 215 may store the branch information in data structures that allow the branch information to be associated with the relevant cache line. Some embodiments of the L2 cache 215 utilize unused error correction coding (ECC) bits in the cache tag array for this purpose. The ECC bits may also be stored in a data array or other locations.

Figure 5:
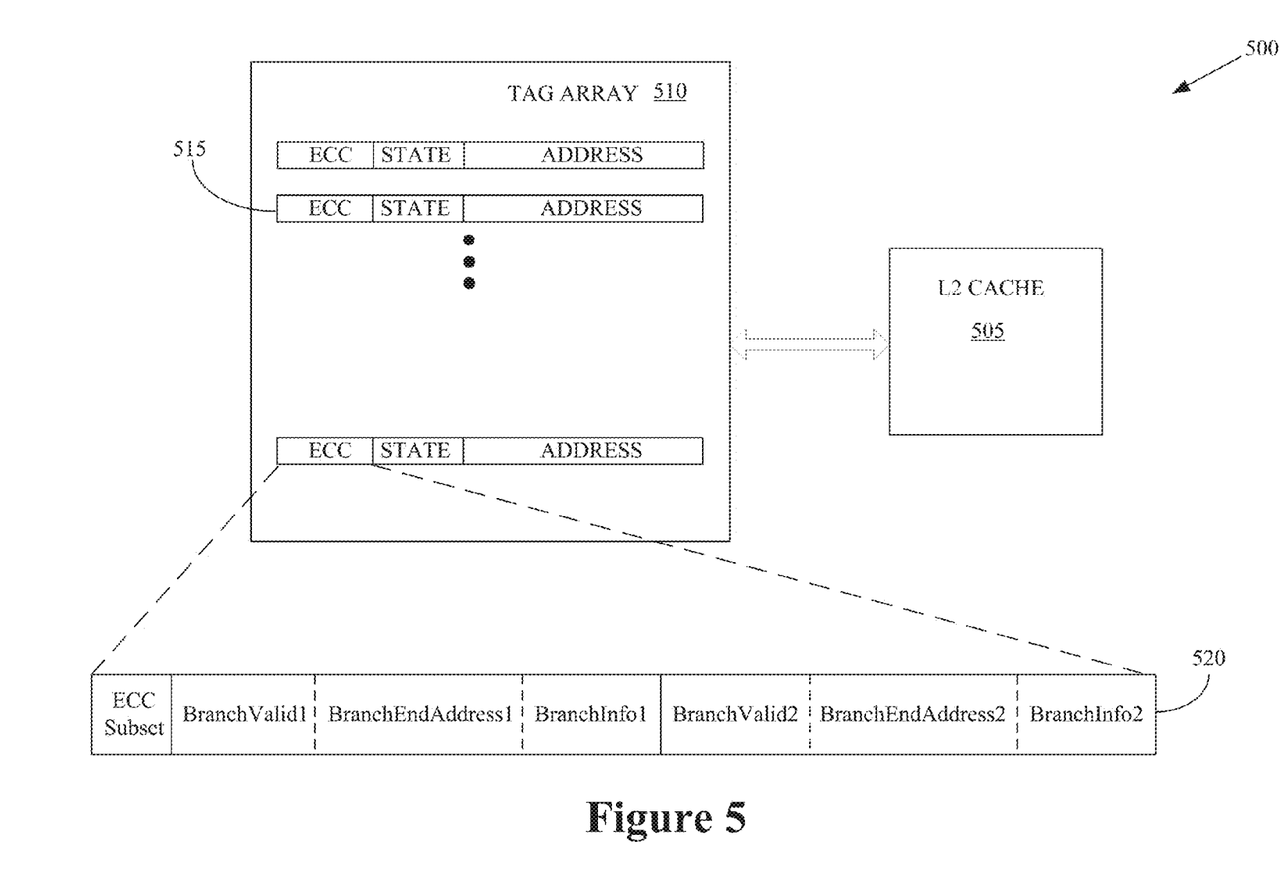
FIG. 5 conceptually illustrates a portion of a semiconductor device that implements a cache and an associated tag array that may be implemented in the semiconductor device depicted in FIG. 1 or the semiconductor device shown in FIG. 2, according to some embodiments.

FIG. 5 conceptually illustrates a portion 500 of a semiconductor device that implements a cache 505 and an associated tag array 510, according to some embodiments, such as the semiconductor device 100 depicted in FIG. 1 or the semiconductor device 200 shown in FIG. 2. The tag array 510 includes one or more lines 515 (only one indicated by a reference numeral in FIG. 5) that indicate the connection between lines of the cache 505 and the lines in the main memory (or other cache memory) that include a version of the data stored in the corresponding line of the cache 505. Each line 515 depicted in FIG. 5 includes the address of the location in the associated memory that includes a version of the data, one or more state bits that are used to indicate the state of the data in the corresponding line of the cache (e.g., whether the cached information is valid), and one or more error correcting code (ECC) bits that can be used to store information used to detect and/or correct errors in either the state bits or the address bits. Some embodiments may alternatively store some or all of the ECC bits in another location such as a data array.

As discussed herein, the full complement of ECC bits may not be used to store error correction information because instructions can be reloaded from main-memory or other caches such as an L3 cache in response to detecting an error on the basis of a subset of the ECC bits. Consequently, a subset of the ECC bits may be used to store the error detection information and the remainder of the bits may remain available for other purposes. Some other embodiments of the tag array 510 may store branch information associated with the corresponding cache line in the ECC bits that are not needed to detect errors in L2 lines that only contain instructions. For example, if a requested cache line holds instructions, the ECC data array 520 may be used to store a subset of the ECC bits and the unused error correction code (ECC) bits in the ECC data array 520 can be used to store (or "silo") the branch instruction information (BranchValid, BranchEndAddress, and BranchInfo) for two branches associated with the cache line. The branch instruction information may be provided to the tag array 510 by an L1 cache in response to the corresponding line being evicted from the L1 cache.

Referring back to FIG. 2, the BTAC 240 may use the siloed branch instruction information to predict target addresses for branch instructions in cache lines of the L2 cache 215. Some embodiments of the BTAC 240 can determine the physical address of the end byte of the branch from the physical address of the fetch request corresponding to the cache line that includes the branch instruction. For example, for a 48 bit physical address and a 64 byte L2 cache line, the BTAC 240 can determine the end byte of the branch using the bits [47:6] of the physical address. Some embodiments of the stored branch instruction information include information for the first two branch instructions (in program order) in the 64 byte cache line. For example, the branch instruction information for each branch instruction includes one bit to indicate whether the branch is valid (BranchValid), six bits to define the end address (BranchEndAddress[5:0]) and eight bits of branch information (BranchInfo[7:0]). Two bits of BranchInfo[2:1] are used to indicate the size of the immediate offset in bytes and a non-zero value indicates that the branch instruction is a direct branch. The bit BranchInfo[0] indicates that the branch target is in-page when this bit is set, e.g., the value of the bit is 1. The bits BranchInfo[5:3] indicate the bias direction of the branch, e.g., for a dynamic JCC. The BTAC 240 may use the values of these bits to predict the direction of dynamic JCCs. For example, a positive value that the branch is taken. Otherwise, the value of these bits indicates that the branch is not-taken. In some embodiments, the magnitude of the BranchInfo[5:3] bits indicates a strength of prediction, e.g., strongly taken, weakly taken, weakly not-taken, or strongly not-taken. The remaining bits in BranchInfo can be used to determine whether the branch is an unconditional direct jump, a static branch that is assumed to be always taken, a conditional branch, or a dynamic conditional branch.

The BTAC 240 may then reconstruct the target address for the branch instruction using the stored branch target information. For example, the BTAC 240 can reconstruct targets fin branches whose silo information (stored in the L2 cache 215) indicates that the corresponding branches are direct and have in-page targets. The branches may also be "sparse" branches, the first N in program order. Some embodiments limit the number of sparse branches that are siloed in the L2 cache 215 to the first two branches in the cache line. Marker information for additional branches in a given cache line may not be stored. However, some embodiments may implement a dense[7:0] vector in the L2 cache 218 that indicates whether aligned blocks in the line have dense branches that may still be resident in the dense marker cache when the L2 line is reloaded in the L1-I cache 220.

Some embodiments of the BTAC 240 determine the target address by adding the immediate offset to the physical address of the branch end byte address. For example, the BTAC 240 can calculate BranchImmediateOffset using BranchInfo[2:1] to determine the last 1-4 bytes of the instruction bytes from the cache line. Values of BranchInfo[2:1] indicate how many bytes to grab from the cache line data and values of BranchEndAddress[5:0] indicates the address of the last byte because immediate bytes are the last bytes in the instruction and BranchEndAddress points to the last byte. In some embodiments, the BTAC 240 may access the cache line twice if all of the immediate bytes are not in the same cache line. The BTAC 240 then generates the target address using:

BranchTarget[47:0]={CacheLinePA[47:12], {CacheLinePA[11:6], BranchEndByteAddress [5:0]}+BranchImmediateOffset[1:0]}

However, persons of ordinary skill in the art having benefit of the present disclosure should appreciate that some embodiments of the BTAC 240 may use different algorithms or types of branch information to predict the target address. The L2 cache 215 may then use the predicted branch target address to determine whether the target address indicates the instruction included in a cache line in the L2 cache 215. The L2 cache 215 may also use inclusion bits such as the inclusion bits 330 shown FIG. 3 to determine whether the target cache line is resident in a corresponding L1-I cache. If not, the L2 cache 215 can cause the target cache line to be provided to the corresponding L1-I cache, e.g., by issuing a prefetch instruction to the prefetcher 235.

Figure 6:
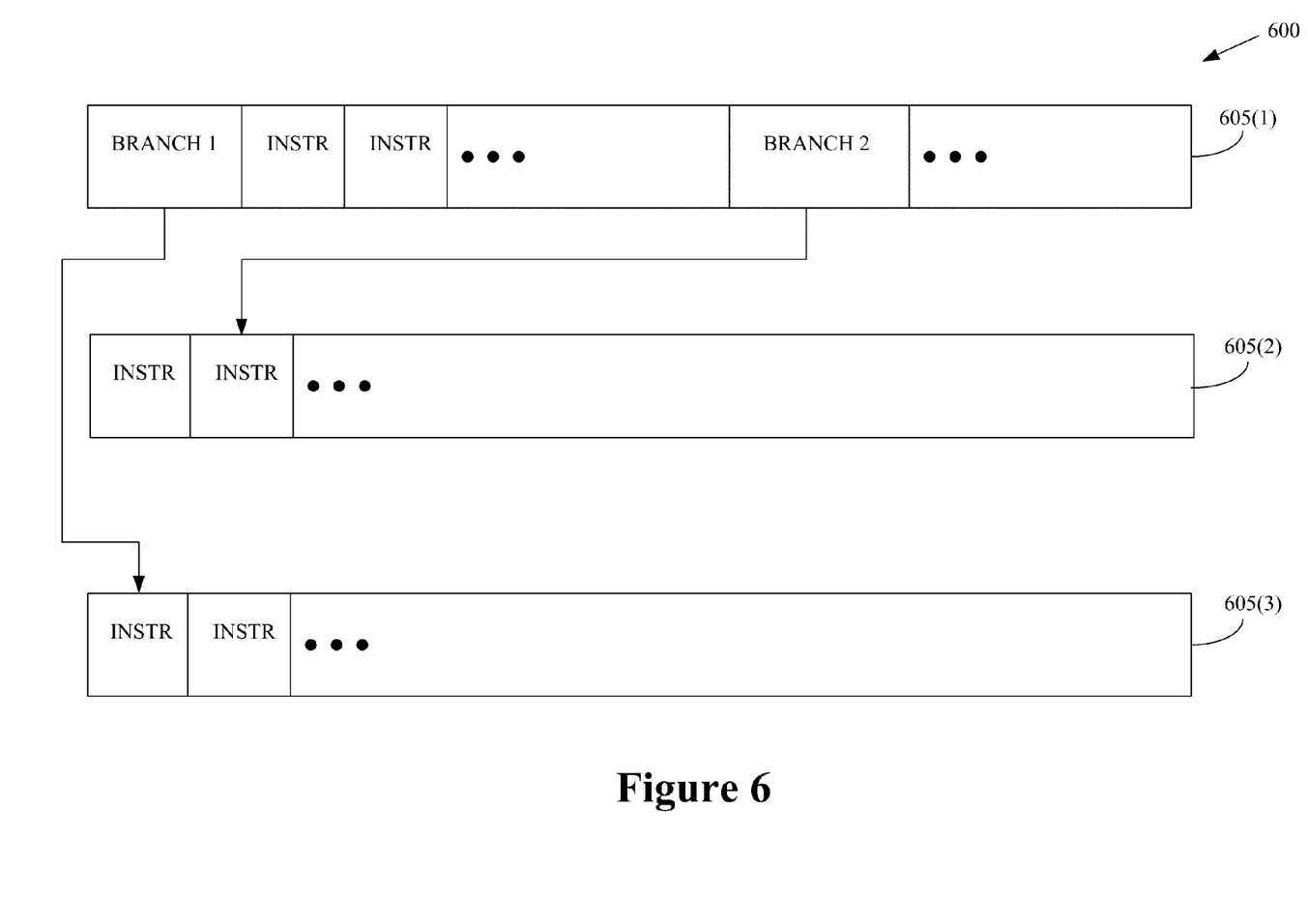
FIG. 6 conceptually illustrates an example of an L2 cache that includes a plurality of cache lines, according to some embodiments.

FIG. 6 conceptually illustrates an example of an L2 cache 600 that includes a plurality of cache lines 605, according to some embodiments. The L2 cache 600 shown in FIG. 6 includes a first instruction line 605(1) that includes at least two branch instructions (BRANCH 1, BRANCH 2) interspersed with other instructions (INSTR). For example, the instruction cache lines 605 may be 64 bytes long and each instruction may be less than or on the order of 15 bytes long. As discussed herein, the L2 cache 600 or associated logic can predict branch target addresses for the branch instructions in the cache line 605(1). The first branch instruction (BRANCH 1) has a target address that indicates an instruction in the instruction cache line 605(3), as indicated by the arrow in FIG. 6. The second branch instruction (BRANCH 2) has a target address that indicates an instruction in the instruction cache line 605(2), as indicated by the arrow in FIG. 6. The L2 cache 600 may then determine whether the cache lines 605(2-3) are resident in a corresponding L1-I cache and, if not, can issue a prefetch request to have one or more of the cache lines 605(2-3) prefetched into the appropriate L1-I cache.

Figure 7:
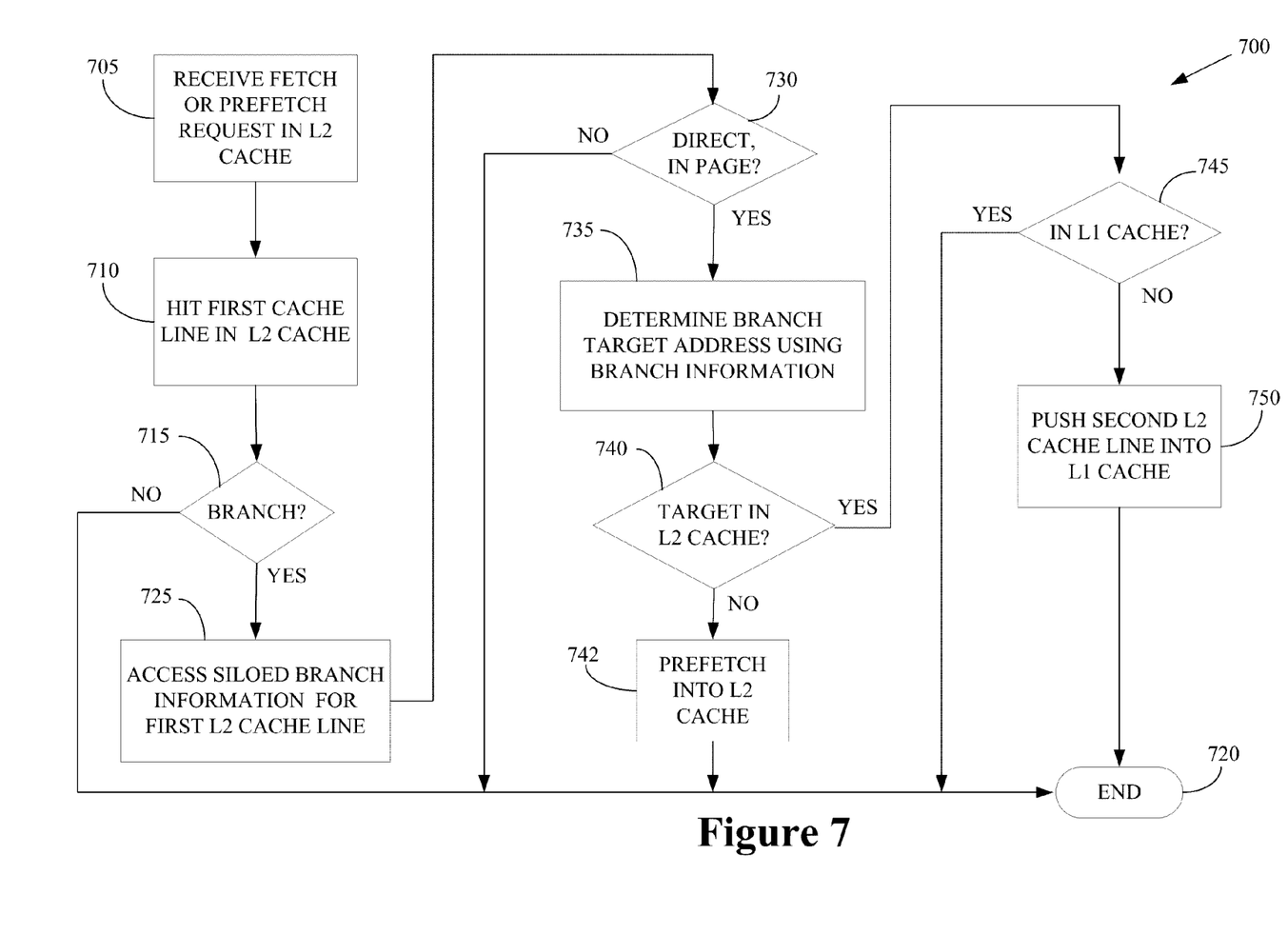
FIG. 7 conceptually illustrates an example of a method for prefetching cache lines based on predicted branch target addresses, according to some embodiments.

FIG. 7 conceptually illustrates an example of a method 700 for prefetching cache lines based on predicted branch target addresses, according to some embodiments. The method 700 shown in FIG. 7 begins when a cache, such as the L2 cache 215 shown in FIG. 1, receives (at 705) a demand request or a prefetch request for a cache instruction line. The request hits (at 710) a (first) cache line in the L2 cache. The L2 cache may then determine (at 715) whether any of the instructions included in the first cache line are branch instructions. If not, the method 700 may end (at 720). If the L2 cache determines (at 715) that the first cache line includes one or more branch instructions, then the L2 cache (or other associated logic) may access (at 725) siloed branch information associated with the first L2 cache line. For example, as discussed herein, the branch information may be stored by the L2 cache in response to the cache line and branch information being evicted from a corresponding L1-I cache such as the L1-I cache 220 shown in FIG. 2.

The branch information may then be used to determine (at 730) whether the branch is a direct, in-page branch. If not, the method 700 may end (at 720). Otherwise, the L2 cache may determine (at 735) a branch target address for one or more of the branch instructions in the cache line using the branch information. Some embodiments of the L2 cache may use a BTAC such as the BTAC 240 shown in FIG. 2 to determine (at 735) the branch target addresses for up to a selected number of branch instructions in the cache line, e.g., up to two instructions. The L2 cache may then determine (at 740) whether the target address indicates an instruction that is in a (second) cache line that is resident in the L2 cache. If not, the second cache line may be prefetched (at 742) into the L2 cache and the method 700 may end (at 720). Some embodiments may also prefetch (at 742) the second cache line into the L1-I cache before the method 700 ends (at 720). Otherwise, the L2 cache determines (at 745) whether the second cache line is also resident in the corresponding L1 cache such as the L1-I cache 220 shown in FIG. 2. For example, the L2 cache may determine (at 740) whether the instruction is resident in the L1-I cache line using inclusion bits associated with the second cache line such as the inclusion bits 330 shown in FIG. 3. If the second cache line is already resident in the L1-I cache, the method 700 may end (at 720). Otherwise, the L2 cache may push (at 750) the second cache line into the L1-I cache, e.g., by issuing a prefetch request for the second cache line. The method 700 may then end (at 720).

Figure 8:
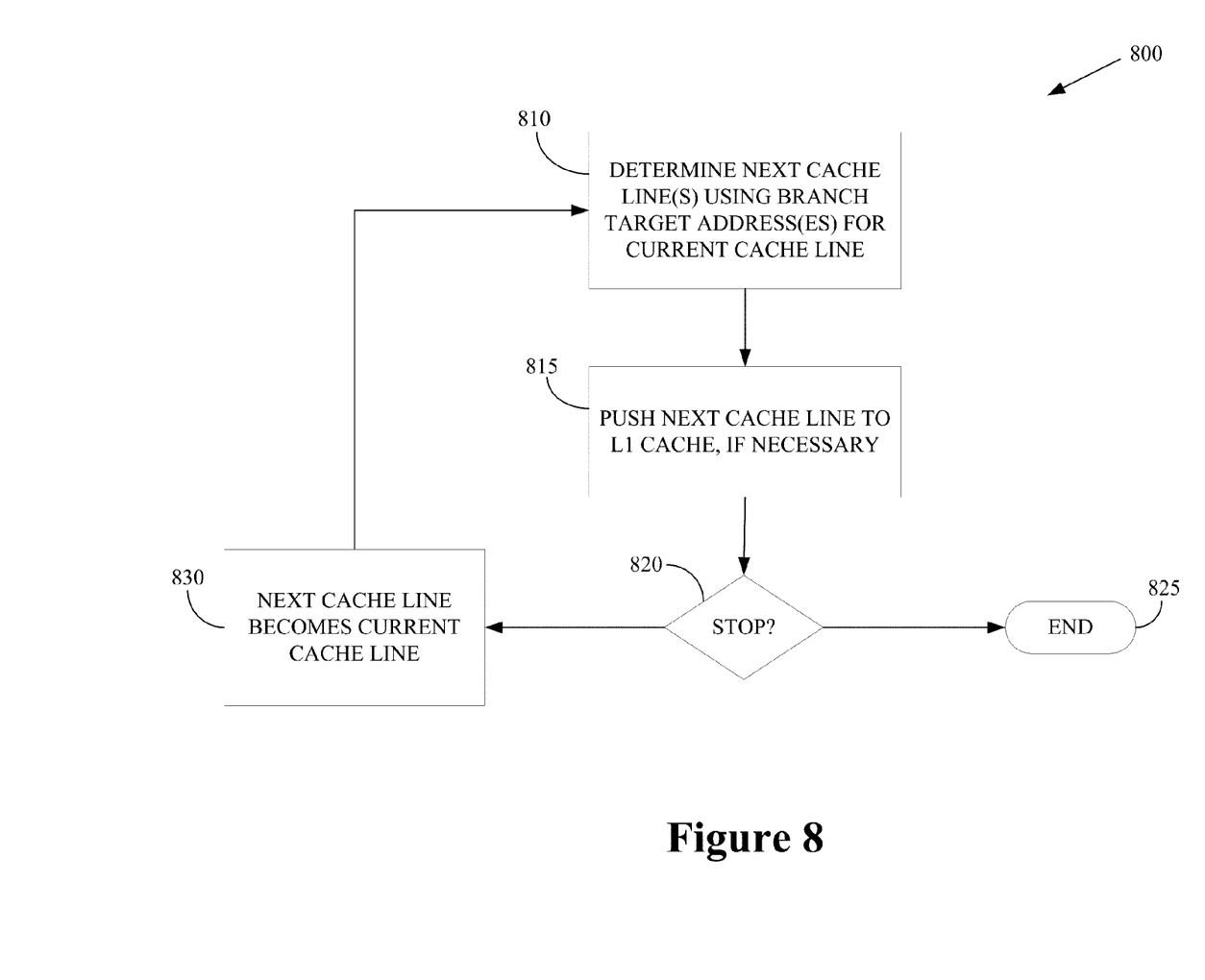
FIG. 8 conceptually illustrates an example of a method for prefetching cache lines based on predicted branch target addresses, according to some embodiments.

FIG. 8 conceptually illustrates an example of a method 800 for prefetching cache lines based on predicted branch target addresses, according to some embodiments. The method 800 shown in FIG. 8 begins when the L2 cache determines (at 810) one or more next cache lines using the branch target addresses that are predicted by a BTAC such as the BTAC 240 shown in FIG. 2. Some embodiments of the method 800 may use portions of the method 700 shown in FIG. 7 such as steps 715, 725, 730, 735, 740 to determine (at 810) the one or more next cache lines. The L2 cache may then push (at 815) the next cache line(s) to the associated L1-I cache, if necessary. Some embodiments of the method 800 may use portions of the method 700 shown in FIG. 7 such as steps 745, 750 to push (at 815) the next cache line to the associated L1-I cache.

The L2 cache may then determine (at 820) whether a stopping condition has been reached. Example stopping conditions include, but are not limited to, causing a selected number of L2 cache lines to be prefetched into the corresponding L1-I cache, reaching a threshold that indicates a certain level of confidence that the predicted branch target address will be taken, encountering an out-of-page branch, or encountering an indirect branch. Other examples of stopping conditions include, but are not limited to, detecting an L2 cache miss, an L2 cache hit for which there is no corresponding eviction from the L1-I cache so that no branch information is available, or an L2 cache hit for a line that was prefetched into the L2 cache so that no branch information for the line is in the L2 silo). Iteration of the method 800 may also be stopped (at 820) in response to an L2 cache hit for a line that is indicated as non-taken by the associated sparse branch information and for which there is a high probability of an unmarked dense branch jumping to an un-computable target. For example, a dense[7:0] vector may have one or more bits set corresponding to aligned blocks after the point at which the program entered the current L2 cache line, which may indicate a high probability of an unmarked dense branch jumping to an un-computable target. Some embodiments may also consider not-taken branches so that execution may continue along the sequential path and a sequential prefetch may be pushed into the L1-I cache. If the stopping condition has been reached, the method 800 may end (at 825). Otherwise, the next cache line may become (at 830) the new current cache line and the L2 cache may continue by determining (at 810) subsequent next cache lines using the branch target addresses for the new current cache line. Some embodiments of the method 800 may therefore allow the L2 cache to follow the future path of program execution and cause cache lines including the instructions in the future path of program execution to be prefetched into the corresponding L1-I cache.

Figure 9:
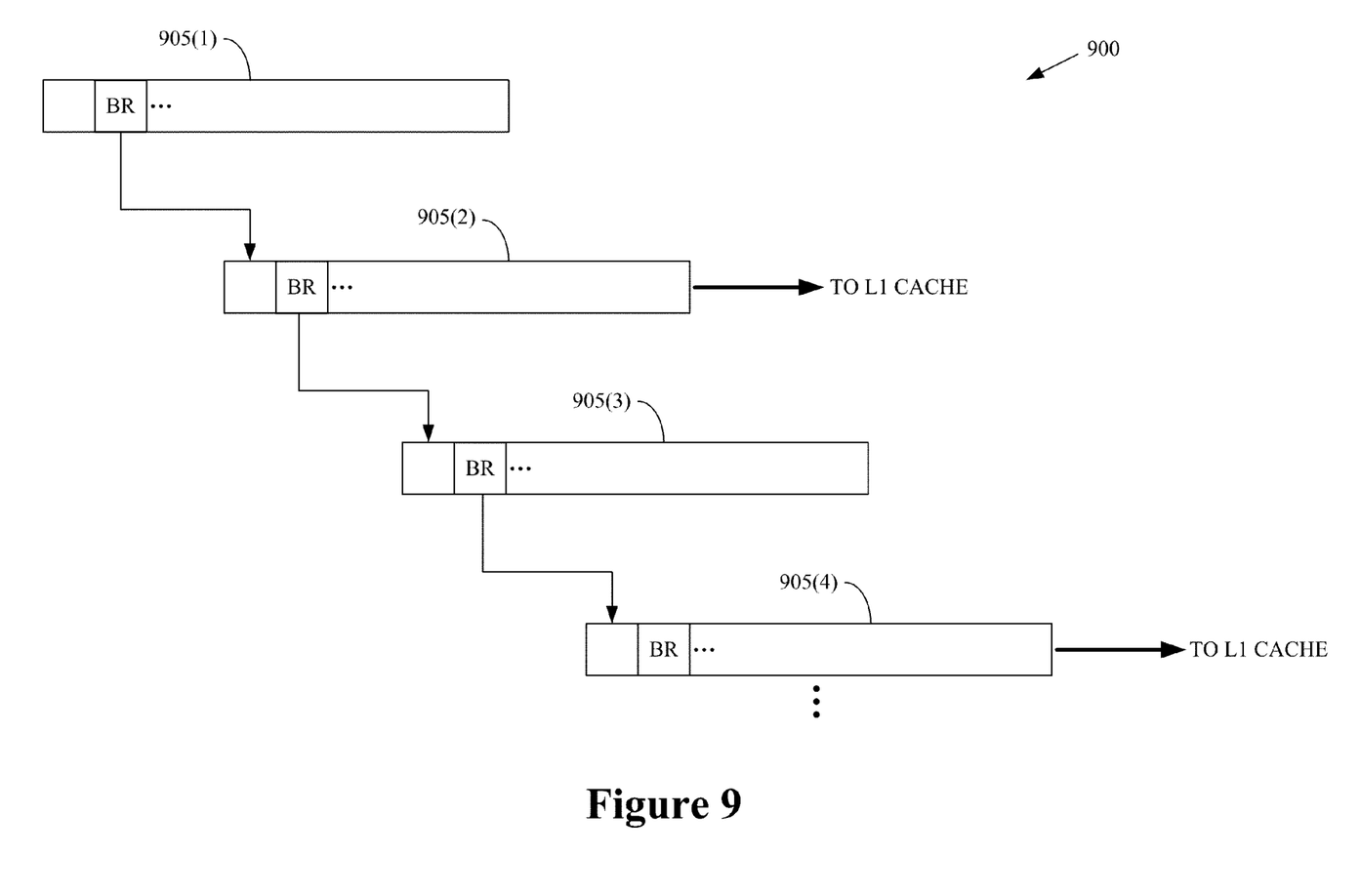
FIG. 9 conceptually illustrates an example of an L2 cache that includes a plurality of cache lines, according to some embodiments.

FIG. 9 conceptually illustrates an example of an L2 cache 900 that includes a plurality of cache lines 905, according to some embodiments. The L2 cache 900 shown in FIG. 9 includes a first instruction cache line 905(1) that includes a branch instruction (BR) that may be interspersed with other instructions. The L2 cache 900 determines that the branch instruction indicates an instruction in the second cache line 905(2). The L2 cache 900 also determines that the second cache line 905(2) is not resident in the corresponding L1 cache and so the L2 cache 900 causes the second cache line 905(2) to be provided to the L1 cache, as indicated in FIG. 9. The second cache line 905(2) also includes a branch instruction (BR) that may be interspersed with other instructions. The L2 cache 900 determines that the branch instruction indicates an instruction in the third cache line 905(3). The L2 cache 900 also determines that the third cache line 905(3) is resident in the corresponding L1 cache and so the L2 cache 900 does not cause the third cache line 905(3) to be provided to the L1 cache. The third cache line 905(3) also includes a branch instruction (BR) that may be interspersed with other instructions. The L2 cache 900 determines that the branch instruction indicates an instruction in the fourth cache line 905(4). The L2 cache 900 also determines that the fourth cache line 905(4) is not resident in the corresponding L1 cache and so the L2 cache 900 causes the fourth cache line 905(4) to be provided to the L1 cache, as indicated in FIG. 9. The L2 cache 900 may continue to follow the future path of program execution as illustrated in FIG. 9 until a stopping condition is reached.

Figure 10:
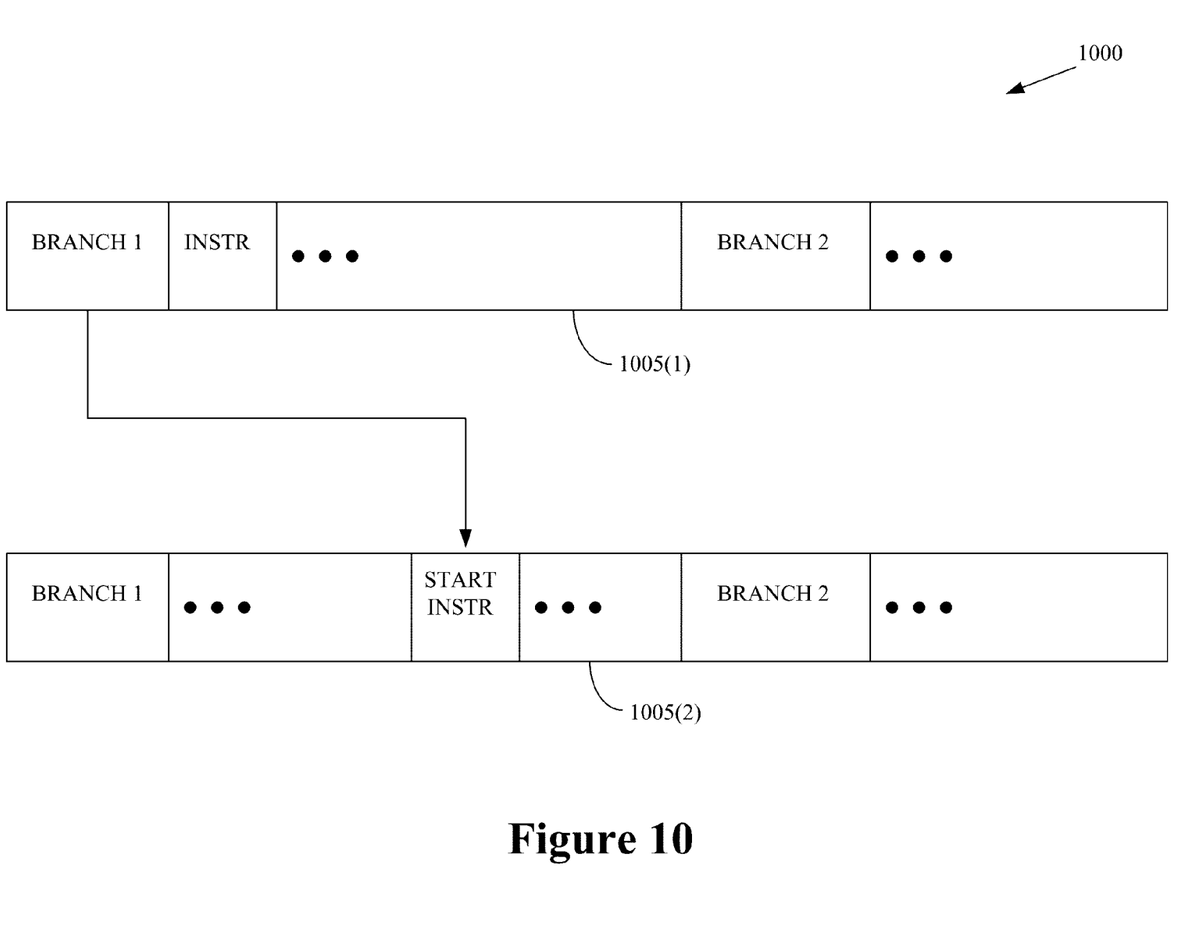
FIG. 10 conceptually illustrates an example of an L2 cache that includes a plurality of cache lines, according to some embodiments.

FIG. 10 conceptually illustrates an example of an L2 cache 1000 that includes a plurality of cache lines 1005, according to some embodiments. The L2 cache 1000 shown in FIG. 10 includes a first instruction line 1005(1) that includes at least two branch instructions (BRANCH 1, BRANCH 2) interspersed with other instructions (INSTR). The L2 cache 1000 determines that the first branch instruction (BRANCH 1) in the first instruction line 1005(1) has a target address that indicates a starting instruction (START INSTR) in the second instruction line 1005(2). The second instruction line 1005(2) also includes at least two branch instructions (BRANCH 1, BRANCH 2). The starting instruction in the second instruction line 1005(2) is positioned following the first branch instruction (BRANCH 1) in the second instruction line 1005(2). Some embodiments of the L2 cache 1000 may therefore bypass predicting a target address for the first branch instruction (BRANCH 1) and only predict target addresses for branch instructions that follow the starting instruction, such as the second branch instruction (BRANCH 2). The L2 cache 1000 may therefore only issue prefetch requests for cache lines associated with the second branch instruction (BRANCH 2) in the second cache line 1005(2) into the corresponding L1-I cache, as discussed herein.

Embodiments of the techniques described herein have a number of advantages over conventional practice. Some embodiments can generate highly accurate prefetches for branch targets whose branches lie in L1 instruction cache fetch/prefetch requests that have been sent to the L2. The conventional approach is to either do sequential prefetching or to use branch target buffers (BTBs) that are not coupled to the L1 instruction cache lines. Conventional approaches can therefore only generate prefetches for branch targets if the fetch request line has a BTB entry. Some embodiments of the techniques described herein can generate the branch target out in the L2 cache, which is much more likely to be able to generate the prefetch because the L2 cache is much larger than a practical BTB.

Some embodiments of the techniques described herein may be implemented in systems that support a fixed instruction length instruction set, such as ARM, MIPS, and the like. The fixed-length instructions can be decoded in the L2 cache, which may reduce or eliminate virtually all of the branch marker silo information. For example, the L2 cache can determine information such as the branch positions, direct/indirect, or in-page/out-of-page information by decoding this information with the simpler instruction set. Some embodiments may silo information in the L2 cache such as conditional branch direction information. However, persons of ordinary skill in the art having benefit of the present disclosure should appreciate that storing the conditional branch direction information in the L2 cache is optional in some embodiments because well-known static prediction tricks such as "backward taken, forward not-taken" may be employed to generate branch prediction information for conditional branches.

Embodiments of processor systems that can prefetch instructions using predicted branch target addresses as described herein (such as the processor system 100) can be fabricated in semiconductor fabrication facilities according to various processor designs. In some embodiments, a processor design can be represented as code stored on a computer readable media. Example codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "providing" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

Furthermore, the methods disclosed herein may be governed by instructions that are stored in a non-transitory computer readable storage medium and that are executed by at least one processor of a computer system. Each of the operations of the methods may correspond to instructions stored in a non-transitory computer memory or computer readable storage medium. In some embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
providing a second cache line to a second cache when a target address for a branch instruction in a first cache line of a first cache is included in the second cache line of the first cache and when the second cache line is not resident in the second cache.

2. The method of claim 1, further comprising determining, in response to the target address for the branch instruction being included in the second cache line, the target address for the branch instruction based on branch information associated with the first cache line.

3. The method of claim 2, wherein determining the target address comprises determining the target address for an in-page, direct branch instruction.

4. The method of claim 2, comprising receiving the branch information associated with the first cache line from the second cache in response to the first cache line being evicted from the second cache.

5. The method of claim 4, wherein the second cache is one of a plurality of instruction caches associated with a plurality of processor cores, and further comprising storing the branch information in error correcting code bits associated with the first cache line.

6. The method of claim 5, wherein the first cache is inclusive of the plurality of instruction caches, and wherein determining whether the second cache line is resident in the second cache comprises determining whether the second cache line is resident in the second cache based on at least one inclusion bit associated with the second cache line in the first cache.

7. The method of claim 1, wherein providing the second cache line to the second cache comprises issuing a prefetch request to prefetch the second cache line into the second cache.

8. The method of claim 1, comprising:
providing a third cache line to the second cache when a target address for a branch instruction in the second cache line is included in the third cache line and when the third cache line is not resident in the second cache.

9. The method of claim 1, comprising prefetching at least one sequential cache line associated with the first cache line in response to determining that a branch to the target address is not-taken.

10. The method of claim 1, comprising iteratively determining whether a target address for a branch instruction in a current cache line of the first cache is included in a cache line in the first cache, determining whether the next cache line is resident in the second cache, and providing the next cache line to the second cache if the target address is included in the next cache line and the next cache line is not resident in the second cache.

11. The method of claim 10, wherein the iterative determination continues until a stopping condition is satisfied.

12. An apparatus, comprising:
a first cache and a second cache; and
a branch target address calculator configurable to provide a second cache line to the second cache when a target address for a branch instruction in a first cache line of the first cache is included in the second cache line of the first cache and when the second cache line is not resident in the second cache.

13. The apparatus of claim 12, wherein the branch target address calculator is configurable to determine the target address for the branch instruction based on branch information associated with the first cache line.

14. The apparatus of claim 13, wherein the branch target address calculator is configurable to determine the target address for an in-page, direct branch instruction.

15. The apparatus of claim 13, wherein the first cache is configurable to receive the branch information associated with the first cache line from the second cache in response to the first cache line being evicted from the second cache.

16. The apparatus of claim 15, wherein the second cache comprises a plurality of instruction caches associated with a plurality of processor cores, and wherein the apparatus comprises error correcting code bits configurable to store the branch information associated with the first cache line.

17. The apparatus of claim 16, wherein the first cache is inclusive of the plurality of instruction caches, and wherein the first cache is configurable to determine whether the second cache line is resident in the second cache based on at least one inclusion bit associated with the second cache line in the first cache.

18. The apparatus of claim 12, comprising a prefetcher, and wherein the first cache is configurable to provide a prefetch request to the prefetcher to request prefetching of the second cache line into the second cache.

19. The apparatus of claim 12, wherein the branch target address calculator is configurable to provide a third cache line to the second cache when a target address for a branch instruction in the second cache line is included in the third cache line and when the third cache line is not resident in the second cache.

20. The apparatus of claim 12, wherein the branch target address calculator is configurable to iteratively determine whether a target address for a branch instruction in a current cache line of the first cache is included in a cache line in the first cache, and wherein the first cache is configurable to determine whether the next cache line is resident in the second cache and to cause the next cache line to be provided to the second cache if the target address is included in the next cache line and the next cache line is not resident in the second cache.

21. The apparatus of claim 20, wherein the iterative determination continues until a stopping condition is satisfied.

22. The apparatus of claim 12, wherein the first cache is configurable to cause at least one sequential cache line associated with the first cache line to be provided to the second cache in response to determining that a branch to the target address is not-taken.

23. A non-transitory computer-readable storage medium encoded with data that, when executed by a fabrication facility, adapts the fabrication facility to manufacture an apparatus, where the apparatus comprises:
a first cache and a second cache; and
a branch target address calculator configurable to provide a second cache line to the second cache when a target address for a branch instruction in a first cache line of the first cache is included in the second cache line of the first cache and when the second cache line is not resident in the second cache.

* * * * *